Patented Jan. 6, 1942

2,269,139

UNITED STATES PATENT OFFICE 2,269,139

PROCESS FOR PRODUCING IMPROVED TITANIUM PIGMENTS

James E. Booge, Wilmington, Del., assignor to E. I. du Pont de Nemours & Company, Wilmington, Del., a corporation of Delaware No Drawing. Application April 27, 1938, Serial No. 204,566

4 Claims. (Cl. 23—202)

This invention relates to the production of improved titanium oxide pigments from titaniferous iron materials. More particularly it relates to the production of titanyl sulfate and the manufacture therefrom of improved titanium oxide pigments.

In the usual process for the manufacture of titanium dioxide pigments a titaniferous iron material, such as ilmenite sand, is attacked by heating with concentrated sulfuric acid added in an amount of between about 1.0 to about 1.5 moles of sulfuric acid per mole of titanium dioxide, thereby converting a part of the titanium and iron content of the ore into water soluble titanium and iron sulfates. The acid concentration is kept within the aforementioned limit since such a requirement is necessary in the later hydrolyzing step. The resultant attack mass is leached with water thus forming a concentrated solution of titanium and iron sulfates contaminated with other metallic impurities of the ore such as compounds of chromium, manganese, nickel, vanadium, and the like, which are solubilized by the sulfuric acid attack. This solution is then treated with a reducing agent such as metallic iron in order to convert the ferric sulfate to ferrous sulfate. The solution is then clarified by some suitable means, such as by settling and filtering, to remove unreacted ore and the like, and a part of its ferrous sulfate content is removed by crystallization at reduced temperatures. A representative titanium liquor so obtained by the usual prior art methods comprises from about 130 to about 170 grams per liter dissolved titanium dioxide, from about 80 to about 120 grams per liter dissolved iron, and from about 240 to about 340 grams per liter sulfuric acid either in combination with titanium dioxide or as free acid. Such liquors are then hydrolyzed by heating and diluting with water to precipitate the titanium sulfate as hydrous titanium oxide containing absorbed sulfuric acid contaminated with appreciable quantities of color imparting impurities such as compounds of iron, chromium, vanadium, and the like. The hydrous titanium oxide is then washed repeatedly with water, dilute acids, and the like, in order to remove at least a part of the aforementioned color imparting impurities, after which it is then calcined under carefully controlled conditions to produce titanium dioxide pigments.

This invention has as an object the manufacture of an improved titanium oxide pigment from titaniferous iron materials such as ilmenite and the like. A further object is the production of an improved crystalline titanium compound from titaniferous iron materials. A still further object is to improve the sulfuric acid attack of titaniferous iron materials. Additional objects will become apparent from an examination of the following description and claims.

Broadly this invention comprises sulfating titaniferous material by treatment with concentrated sulfuric acid. The titanium sulfate is then dissolved in water and the resulting solution clarified. Thereafter titanyl sulfate is crystallized therefrom at an elevated temperature. The crystalline titanyl sulfate is then separated from the acid liquor and calcined to produce anhydrous titanium oxide in a finely divided condition.

In a more restricted sense this invention comprises sulfating a titaniferous material by treatment with concentrated sulfuric acid in the amount of from about 2 to about 4 moles sulfuric acid per mole titanium dioxide. The resulting titanium sulfate is dissolved in water and the resulting solution clarified. The content of the free and titanium combined sulfuric acid in the clarified solution is increased to about 500 to about 700 grams per liter while the titanium oxide content is adjusted to within the range of about 10 to about 250 grams per liter. Titanyl sulfate is then crystallized therefrom at an elevated temperature and these crystals are separated from the acid liquor and calcined, thereby producing anhydrous titanium oxide.

In the preferred embodiment of this invention a concentrated titanium oxide ore containing not more than about 5% iron, preferably one such as obtained by the process disclosed in copending application #200,748, filed April 7, 1938, is mixed with a quantity of 96% sulfuric acid and then with sufficient filtrate from the precipitation of titanyl sulfate, as hereinafter described, to reduce the sulfuric acid concentration to about 92%, the molecular ratios of $TiO_2$ to $H_2SO_4$ in the final mixture being of the order of 1 to from about 2.2 to about 3. The sulfuric acid dilution step increases the temperature of the mixture sufficiently to initiate the reaction between titanium oxide and sulfuric acid. This reaction being exothermic, the conversion of the titaniferous material to water soluble sulfates of titanium, iron, and the like, proceeds of its own accord with great rapidity at temperatures of approximately 200° C. The resultant attack mass, consisting essentially of water soluble sulfate of titanium and minor amounts of sulfates of iron, chromium, vanadium, and the like, is allowed to cool and is then agitated for a period of time between about 12 to about 18 hours in about an equal part by weight of water or dilute sulfuric acid. The solution is allowed to settle and is filtered to remove the minor amounts of unreacted ore and the like contained therein. The clarified solution thus obtained contains from about 100 to 200 grams per liter dissolved titanium oxide, from about 250 to 700 grams per liter $H_2SO_4$ free or combined with titanium, together with minor amounts of soluble compounds of iron, chromium, vanadium, and the like. Sulfuric acid is added in sufficient amount to provide in the solution a total of from about 600 to about 700 grams per liter $H_2SO_4$ as free acid and acid combined with titanium. The acid titanium sulfate solution so obtained is now boiled under a reflux condenser for a period of time between about 4 to about 8 hours, in the presence of about 0.1% of $TiOSO_4.2H_2O$ crystals from a previous batch, introduced as "seed" material, thereby precipitating the titanium as crystalline titanyl sulfate dihydrate, $TiOSO_4.2H_2O$. Under such conditions of acidity, impurities such as iron, vanadium, and chromium, do not tend to precipitate as they do in normal hydrous titanium oxide hydrolysis processes. Furthermore, the crystalline titanium precipitate so formed does not occlude such quantities of impurities as do the gelatinous precipitates of prior art processes. As a consequence, the titanyl sulfate obtained on filtering the crystalline precipitate of my novel process contains much smaller amounts of harmful color imparting impurities, such as compounds of iron, chromium, vanadium, and the like, than do the hydrous titanium oxide precipitates of prior art titanium hydrolysis processes. The crystalline titanyl sulfate precipitate is filtered off and washed with about 500 grams per liter $H_2SO_4$, as in a basket centrifuge of bronze, Monel metal or lead, in order to substantially remove the last traces of mother liquor and impurities contained therein. The resultant purified titanyl sulfate is then calcined at a temperature between about 925° C. to about 1000° C., thereby producing a superior finely divided anhydrous titanium dioxide pigment.

The following example is given for illustrative purposes and is not intended to place any restrictions on the herein described invention:

Example 600 lbs. titanium oxide concentrate, comprising 95% $TiO_2$, 2% $Fe_2O_3$, and minor amounts of chromium and vanadium, obtained from ilmenite sand by the process of copending application #200,748, was stirred into 1868 lbs. 96% sulfuric acid. The 96% sulfuric acid was diluted to a concentration of 92% $H_2SO_4$ and a weight of 1989 lbs., by addition of 112 lbs. filtrate, comprising 25% $H_2SO_4$, from a previous titanyl sulfate precipitation operation. The reaction between the titanium oxide concentrate and sulfuric acid was initiated by the dilution of the latter and proceeded rapidly to completion within one hour. The resultant sulfated mass was allowed to cool and was then agitated with 2600 lbs. water for a period of 15 hours and the resulting solution was filtered. This solution contained 155 g./l. dissolved $TiO_2$, 3.3 g./l. dissolved $Fe_2O_3$, 490 g./l. $H_2SO_4$ (free and combined with titanium), and minor amounts of soluble compounds of vanadium and chromium. To this solution was added sufficient 96% sulfuric acid to make the acid concentration (free and combined with titanium) 650 g./l. The solution was then boiled under a reflux condenser for 4.5 hours, at the end of which time essentially all of the titanium present had crystallized out as titanyl sulfate. The crystals were separated from the mother liquor by filtering and were washed with 500 g./l. sulfuric acid. The crystals obtained were heated gradually, in an internally fired rotating calciner, from room temperature to 950° C. during a period of 11 hours and were maintained at 950° C. for 1 hour. Anhydrous titanium dioxide in a finely divided condition and possessing superior pigment properties was thereby produced.

It is to be understood that the hereinbefore described specific embodiments of my invention may be subject to variation and modification without departing from the scope thereof. For instance, I prefer to employ as starting material in my process a titanium oxide concentrate prepared by the process of copending application #200,748 which comprises oxidizing a titaniferous ore, such as ilmenite, by roasting it in the presence of air at a temperature within the range of about 750° C. to 1000° C. and thereafter subjecting the oxidized ore to the action of gaseous hydrogen chloride at a temperature within the range of about 600° C. to 800° C., thereby removing essentially all of the ferric oxide in said oxidized ore by volatilizing it as ferric chloride. However, titanium oxide concentrates obtained by such processes as are disclosed, for example, in U. S. Patents 668,266, 921,686, 1,106,406, 1,106,407, 1,106,408, 1,106,409, 1,106,410, 1,166,547, 1,171,542, 1,201,541, 1,206,796, 1,206,797, 1,206,798, 1,256,368, 1,325,561, 1,334,004, 1,348,843, 1,528,319, 1,542,350, 1,618,795, 1,696,188, 1,699,173, 1,711,738, 1,728,296, 1,734,034, 1,845,342, 1,902,203, 1,911,396, 2,088,913 and Re. 15,973 are eminently suitable for the operation of my novel process. Furthermore, I may also use as starting materials naturally occurring titaniferous iron materials such as ilmenite and the like. When using such materials, however, it is preferred that all of the ferric sulfate in the liquor resulting from solution of the attack mass in water be reduced to the ferrous condition, as by treatment with scrap iron or tin scrap, and furthermore that the clarified solution, prior to acid addition and titanyl sulfate crystallization, be cooled to crystallize out the bulk of the ferrous sulfate. My preferred titanium raw material for use in my novel process is titanium oxide concentrate containing not more than about 5% iron, and, on account of economic reasons, the titanium oxide concentrate which I prefer to employ is that obtained by the process of copending application #200,748. Titaniferous materials such as ilmenite and the like containing appreciably higher percentages of color-imparting impurities, particularly iron, may be used although in obtaining titanyl sulfate from acid solutions prepared therefrom it is essential that longer and more careful washing of the titanyl sulfate be resorted to than is the case when my preferred titanium raw materials are used.

The optimum conditions of attack of the titanium oxide concentrate or titaniferous ore can best be learned by experimental trial and the conditions will vary with the source and previous history of the titanium raw material. The sulfuric acid employed may be concentrated sulfuric acid as such, or it may be a mixture of oleum and dilute virgin acid or the acid filtrate from crystallization of the titanyl sulfate. Furthermore, the reaction between the titanium oxide material and the sulfuric acid may be initiated by dilution of the acid with dilute sulfuric acid filtrate from crystallization of the titanyl sulfate, dilute virgin sulfuric acid or water, or it may be initiated by heating the reaction mixture. In no case however, should the reacting acid contain less than about 90% $H_2SO_4$ and it is preferred that it should contain not more than about 98% $H_2SO_4$.

The optimum proportions of titanium oxide to sulfuric acid in the attack mixture can best be learned by experimental trial and the ratio will vary with the source and previous history of the titanium raw material, the attack conditions, and the strength of the acid employed. In certain instances, essentially all of the titanium oxide is solubilized when the titanium oxide and acid are in the proportions of 1 mole $TiO_2$ to as low as about 2 moles $H_2SO_4$. For increased effects the sulfuric acid may be employed in the amount of about 4 moles $H_2SO_4$ per mole of $TiO_2$ although for most ordinary purposes I prefer to employ from about 2.2 to 3 moles $H_2SO_4$ per mole of $TiO_2$.

The optimum proportions of attack mass to water or dilute sulfuric acid employed to dissolve said attack mass can best be learned by experimental trial and the ratio will vary with the source and previous history of the titanium raw material and the proportions of titanium and sulfuric acid in the attack mass. As much as about 2 parts and as little as about 0.75 part dilute acid or water to 1 part attack mass may be employed, although usually I prefer to use about 1 part water or dilute acid to 1 part attack mass.

The optimum concentration of sulfuric acid in the solution heated to precipitate titanyl sulfate may vary between about 500 grams per liter $H_2SO_4$ (free and combined with titanium) to 700 grams per liter or higher. However, in most instances I have found concentrations in the range of about 600 to about 700 grams per liter $H_2SO_4$ (free and combined with titanium) to be preferable.

The content of dissolved $TiO_2$ in the solution referred to hereinabove may be varied from about 10 grams per liter to about 250 grams per liter, although it is preferred that the concentration of dissolved $TiO_2$ shall be in the range of about 50 to about 175 grams per liter.

The optimum temperature of crystallization of titanyl sulfate can best be learned by experimental trial and the temperature will vary with the concentration of the solution. With concentrated solutions a temperature as low as about 80° C. may be employed. However, in most cases I prefer to crystallize at temperatures in the range from about 100° C. to the boiling point of the solution.

While I prefer to wash my crystalline titanyl sulfate precipitate with 50% $H_2SO_4$, it must be understood that more or less concentrated sulfuric acids may be employed for this purpose. Furthermore, particularly in those instances where it is desired to recover my titanyl sulfate as such, the sulfuric acid wash liquor may be removed by washing with organic solvents which are miscible with water and which have no dissolving action on the crystals, such as, for example, alcohol, acetone, ethylmethyl ketone, diethyl ether, glacial acetic acid, and the like. Also, the titanyl sulfate crystals may be washed in the first instance with the organic solvent, the use of sulfuric acid for said washing being dispensed with entirely. Any organic solvent adhering to the titanyl sulfate may be removed by drying said crystals such as in a vacuum drier provided with suitable condensing equipment to permit recovery of the organic solvent.

It is still further to be understood that the optimum calcination conditions for conversion of my titanyl sulfate to anhydrous titanium oxide can best be learned by experimental trial and the calcination conditions will vary with the conditions under which the titanyl sulfate is precipitated and the use requirements of the finished pigment. I have determined, however, that it is essential in order to convert titanyl sulfate to titanium dioxide of excellent pigment quality that the titanyl sulfate should be heated gradually to calcination temperature and thereafter heated at said calcination temperature for a period of from about 1 to about 2 hours. In no case should the total heating period be less than about 3 hours. Improved effects are obtained with heating periods of about 6 hours or higher; and I prefer to employ total heating periods of from about 10 to about 20 hours. The calcination temperature may be varied from about 850° C. to about 1050° C., although for most ordinary purposes I prefer to calcine at a temperature in the range from about 925° C. to about 1000° C.

While my invention has been illustratively described with respect to the production of titanium dioxide pigment only, obviously it is applicable to all titanium oxide pigments, such as titanates, which may be obtained by calcination of the product of my invention with suitable metal oxides, or extended titanium dioxide pigments which may be obtained by blending my novel titanium oxide with lithopone, barium sulfate, calcium sulfate, calcium sulfite, calcium carbonate, clay, magnesium silicates, and the like.

My process possesses advantages not previously combined in a single process. Furthermore, the products of my process possess advantages not previously combined in a single material. For example, the concentrated acid employed in my attack of the titaniferous material and the high ratio of $H_2SO_4$ to $TiO_2$ in said attack allows solubilization of essentially all of the titanium oxide. Such high acid concentrations are not permissable in prior art titanium hydrolysis processes since at such high acid concentrations little, if any, titanium compound is precipitated by said hydrolysis processes. Furthermore, as hereinbefore described, the crystalline titanyl sulfate precipitate of my novel process contains much smaller amounts of harmful color imparting impurities, such as compounds of iron, chromium, vanadium, and the like, than do the titanium precipitates of prior art titanium hydrolysis processes. In addition, the small amounts of such impurities associated with my crystalline titanyl sulfate precipitate are much more readily removed by washing than are the impurities contained in the prior art hydrolysis precipitates. As a consequence, the calcined anhydrous titanium oxide pigment of my novel process is definitely superior in color to the titanium oxide pigments obtained by calcination of the precipitates of prior art hydrolysis processes.

As many apparently widely different embodiments of this invention may be made without departing from the spirit and scope thereof, it is Having described the present invention the following is claimed as new and useful.

1. In a process for preparing titanium oxide of pigment quality from titaniferous materials, the steps which comprise sulfating the titanium content by treatment with between about 2 moles to about 4 moles of concentrated sulfuric acid, said acid having a concentration of at least 90%, dissolving the resulting titanium sulfate in water, crystallizing titanyl sulfate therefrom at an elevated temperature, gradually heating the titanyl sulfate to calcination temperatures, said gradual heating period of the titanyl sulfate covering at least 6 hours, and thereafter maintaining calcination temperatures for between about 1 and about 2 hours to produce anhydrous titanium oxide.

2. In a process for preparing titanium oxide of pigment quality from titanium oxide concentrates, the steps which comprise sulfating the titanium content by treatment with between about 2 moles to about 4 moles of sulfuric acid, said acid having a concentration of at least 90%, dissolving the resulting titanium sulfate in water, crystallizing titanyl sulfate therefrom at an elevated temperature, gradually heating the titanyl sulfate to calcination temperatures, said gradual heating period covering at least 6 hours, and thereafter maintaining calcination temperatures for between about 1 and about 2 hours to produce anhydrous titanium oxide.

3. In a process for preparing titanium oxide of pigment quality from titanium oxide concentrates, the steps which comprise sulfating the titanium content by treatment with between about 2 moles to about 4 moles of sulfuric acid, said acid having a concentration of at least 90%, dissolving the resulting titanium sulfate in water, crystallizing titanyl sulfate therefrom at a temperature between about 100° C. and about the boiling point of the solution, gradually heating the titanyl sulfate to calcination temperatures, said gradual heating period covering at least 6 hours, and thereafter maintaining calcination temperatures for between about 1 and about 2 hours to produce anhydrous titanium oxide.

4. In a process for preparing titanium oxide of pigment quality from titanium oxide concentrates, the steps which comprise sulfating the titanium content by treatment with between about 2 moles to about 4 moles of sulfuric acid, said acid having a concentration of at least 90% and not exceeding 98%, dissolving the resulting titanium sulfate in water, increasing the acid content of the solution to between about 500 to about 700 grams per liter while adjusting the titanium oxide content to within the range of between about 50 to about 175 grams per liter, crystallizing titanyl sulfate therefrom at a temperature between about 100° C. and the boiling point of the solution, separating said crystals from the acid liquors, gradually heating the titanyl sulfate to calcination temperatures, said gradual heating period covering at least 6 hours, and thereafter maintaining calcination temperatures for between about 1 and about 2 hours to produce anhydrous titanium oxide.

JAMES E. BOOGE.